US012769868B2

(12) United States Patent
Carr et al.
(10) Patent No.: US 12,769,868 B2
(45) Date of Patent: Oct. 20, 2026

(54) SYSTEMS AND METHODS FOR CONSTRUCTING ENCRYPTED INDEXES TO SUPPORT ENCRYPTED QUERIES

(71) Applicant: Enveil, Inc., Fulton, MD (US)

(72) Inventors: Ryan Carr, Fulton, MD (US); Jacob Michael Alperin-Sheriff, Olney, MD (US)

(73) Assignee: Enveil, Inc., Fulton, MD (US)

( * ) Notice: Subject to any disclaimer, the term of this patent is extended or adjusted under 35 U.S.C. 154(b) by 102 days.

(21) Appl. No.: 18/905,091

(22) Filed: Oct. 2, 2024

(65) Prior Publication Data

US 2025/0139279 A1 May 1, 2025

Related U.S. Application Data

(60) Provisional application No. 63/593,458, filed on Oct. 26, 2023.

(51) Int. Cl.

| | |
|---|---|
| ***G06F 21/00*** | (2013.01) |
| ***G06F 16/22*** | (2019.01) |
| ***G06F 16/2455*** | (2019.01) |
| ***G06F 21/62*** | (2013.01) |
| ***H04L 9/00*** | (2022.01) |
| ***H04L 9/06*** | (2006.01) |

(52) U.S. Cl.

CPC .......... *G06F 21/6227* (2013.01); *G06F 16/22* (2019.01); *G06F 16/24565* (2019.01); *H04L 9/008* (2013.01); *H04L 9/0618* (2013.01); *H04L 9/0643* (2013.01)

(58) Field of Classification Search

CPC ................. G06F 21/6227; G06F 16/22; G06F 16/24565; H04L 9/008; H04L 9/0618; H04L 9/0643

See application file for complete search history.

(56) References Cited

U.S. PATENT DOCUMENTS

| | | | | |
|---|---|---|---|---|
| 10,903,976 | B2 * | 1/2021 | Williams | H04L 9/008 |
| 2005/0004924 | A1 * | 1/2005 | Baldwin | G06F 16/2246 |
| 2005/0166046 | A1 * | 7/2005 | Bellovin | H04L 63/0428 713/165 |
| 2021/0157682 | A1 * | 5/2021 | Antonopoulos | G06F 11/1469 |
| 2025/0077700 | A1 * | 3/2025 | Han | H04L 9/0836 |

OTHER PUBLICATIONS

Beneš, Václav E., ed., "Mathematical theory of connecting networks and telephone traffic," Academic press, 1965. pp. 28-33.

Waksman, "A Permutation Network." Journal of the ACM (JACM) 15.1 (1968): 159-163, Jan. 1968, 5 pages.

* cited by examiner

*Primary Examiner* — William A Corum, Jr.

(74) *Attorney, Agent, or Firm* — Carr & Ferrell LLP

(57) ABSTRACT

Described herein are methods and systems for constructing an encrypted index of a database to facilitate secure and efficient encrypted queries. An example method includes creating a plaintext index sorted by specific attributes, mapping records to integers via a hash function, permuting records using a pseudo-random permutation network, and generating an encrypted swap vector through homomorphic encryption. This encrypted swap vector is then sent to the database, enabling the creation of an encrypted index that maintains query privacy while supporting efficient retrieval of data.

20 Claims, 4 Drawing Sheets

SYSTEMS AND METHODS FOR CONSTRUCTING ENCRYPTED INDEXES TO SUPPORT ENCRYPTED QUERIES

CROSS-REFERENCE TO RELATED APPLICATIONS

This application claims the benefit and priority of U.S. Provisional Application 63/593,458, filed on Oct. 26, 2023, which is hereby incorporated by reference in its entirety, including all references and appendices cited therein.

FIELD

The present disclosure pertains broadly to systems and methods for constructing encrypted indexes to support secure and private querying.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for creating an encrypted index of a database. The method also includes mapping each record in the plaintext index to an integer based on the attributes of each record; permuting mapped records using a pseudo-randomly selected permutation generated by a permutation network; encrypting the permutation using a homomorphic encryption scheme to create an encrypted swap vector; and transmitting the encrypted swap vector to the database, where the database generates the encrypted index by applying a series of encrypted swaps to the plaintext index using the permutation network and the encrypted swap vector. Other embodiments of this aspect include corresponding computer systems, apparatus, and computer programs recorded on one or more computer storage devices, each configured to perform the actions of the methods.

Implementations may include one or more of the following features. The method used to map records to integers may be a hash function, and is not required to be a cryptographic hash function. The method may include the querier simulating a permutation network to compute a valid configuration of swap gates that realizes the desired permutation. The permutation network may include a plurality of swap gates, each configured to conditionally swap two inputs based on control bits. The encrypted swap vector may include encrypted control bits for each swap gate in the permutation network. The database generates the encrypted index by evaluating the permutation network using encrypted swaps, where the encrypted swap vector provides the control bits for the encrypted swaps, and storing the resulting ciphertexts as the encrypted index. The encrypted index allows for secure querying by: computing plaintext index labels for query values; and identifying corresponding positions in the encrypted index; and retrieving encrypted records from those positions. Implementations of the described techniques may include hardware, a method or process, or computer software on a computer-accessible medium.

One general aspect includes a method for securely querying an encrypted database. The method also includes receiving a query specifying constraints on database records to be retrieved; transforming query constraints using the same permutation as the one used to construct the encrypted index, to compute the query constraints' position(s) in the encrypted index; transmitting the position(s) in the encrypted index to the database server without revealing the query constraints; identifying on the database server the encrypted records at requested position(s) in the encrypted index; transmitting encrypted records at matching position(s) to a querying entity; decrypting the encrypted matching records; and reverse-transforming decrypted records to correlate with the query constraints, thereby obtaining query results while maintaining privacy. Other embodiments of this aspect include corresponding computer systems, apparatus, and computer programs recorded on one or more computer storage devices, each configured to perform the actions of the methods.

Implementations may include one or more of the following features. The method where the querier computes the plaintext index label for each query value and finds the position of the computed plaintext index label in the chosen permutation. The transformed query may include the positions of the query values in the permuted index, where the positions are determined based on the plaintext index labels computed for the query values. The method may include locally storing the decrypted records and their corresponding plaintext index labels retrieved from the encrypted index for future queries. Reverse-transforming decrypted records may include correlating the decrypted records with the original query constraints using the plaintext index labels associated with the decrypted records. Implementations of the described techniques may include hardware, a method or process, or computer software on a computer-accessible medium.

One general aspect includes a system for securely processing queries on an encrypted database a processor and memory for storing instructions, the processor executing the instructions to: receive a query and apply a permutation network to obfuscate query constraints; cause the storage of an encrypted index of database records and execute a transformed query without revealing underlying data; decrypt results and reverse-transform the decrypt results to match the query constraints; and securely manage and store cryptographic keys used in encryption and decryption processes. Other embodiments of this aspect include corresponding computer systems, apparatus, and computer programs recorded on one or more computer storage devices, each configured to perform the actions of the methods.

Implementations may include one or more of the following features. The system where the processor is further configured to locally store decrypted records retrieved from the encrypted index. The processor is further configured to utilize the locally stored decrypted records to answer future queries that request the same records. The processor is further configured to select a random position in the encrypted index, retrieve the encrypted record from that position, decrypt the record, and store the decrypted record locally. The processor is further configured to periodically request that the database reconstruct the encrypted index with a new pseudo-random permutation, and to delete locally stored records after the encrypted index is reconstructed. The permutation network is implemented using a Benes or Waksman network. Implementations of the described techniques may include hardware, a method or process, or computer software on a computer-accessible medium.

DETAILED DESCRIPTION OF EXAMPLE EMBODIMENTS

Overview

Figure 1:
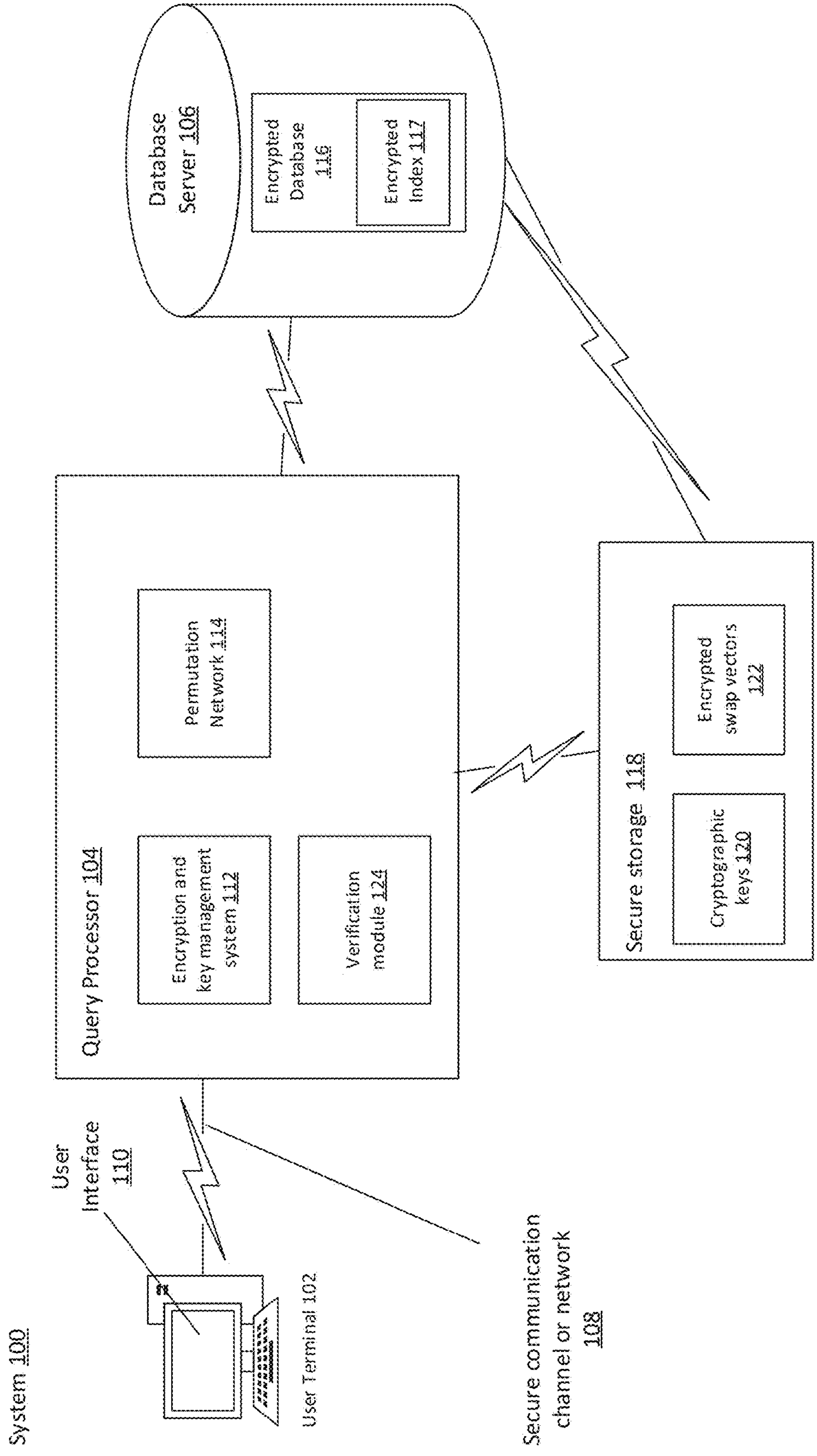
FIG. 1 illustrates a high-level architecture of the system for securely querying an encrypted database.

One of the most common types of interactions between different information systems is a query, in which one system requests information from another system that offers access to a repository of information (most such systems are databases, or are services built on top of one or more databases). In most queries, the information requested is specified by a set of constraints that defines which records the querying system is interested in, e.g., a user identifier, a date and time range, a geographical region, etc. In operational databases, the repository of information that can be queried is organized into one or more indexes, where an index is a data structure that allows for efficient lookup of information in response to a query. Indexes generally sort records according to their value along one or more of the records' attributes, and a single index may only support efficient lookup for queries whose constraints include those used to sort the index. For example, a database containing customer records may have an index that sorts those records by the customer's telephone number; this index could be used to efficiently execute queries that contained a telephone number as a constraint.

Indexes support efficient query execution by leveraging the knowledge of the query constraints and the underlying records in the database to avoid examining the vast majority of records in the database when responding to the query; the data in the index is sorted in such a way that the database can navigate to the position of the desired records in the index by examining a few records, at most. By contrast, a query that has no constraints, or only has constraints that do not have a compatible index, will require the database to scan every record in the table and consider whether it matches or not; this is generally many orders of magnitude slower than an indexed query. Constructing a set of indexes that support all commonly submitted types of queries is one of the primary ways to optimize database performance.

One limitation of a standard database query is that it is sent in plaintext to the database, which then learns both the contents of the query and the set of records it sends in response; this information is then also exposed to the organization administering the database. There are many use cases in which one organization could derive value from a data set offered by another organization, but exposing this information to the other organization via a standard database query would be unwise, unsafe, or illegal, so a standard database query is not possible. For example, a bank in Switzerland could potentially reduce fraud by checking applicants seeking to open an account against a risk database hosted in the United States, but performing such checks using a standard query would disclose the applicant's identity to an organization in the United States; Switzerland has robust privacy laws that prohibit making this disclosure, so such an interaction is not possible using a standard query.

One way around these limitations is to perform an encrypted query. In an encrypted query, an algorithm for private information retrieval (PIR) is used to retrieve the desired information from the database. PIR algorithms use cryptographic techniques to allow the querier to retrieve records matching specific constraints from the database, while guaranteeing that the database cannot learn which constraints were requested or which records were returned.

The major drawback to all existing PIR algorithms, compared with standard (i.e., plaintext) queries, is their slower performance. While there is some overhead from cryptographic operations, most of the performance difference comes from the fact that a database running an encrypted query will, by definition, not be able to learn the specific values of the query constraints, and so the database cannot use this information to reduce the space of data that much be searched the way plaintext database indexing techniques do. Thus, the problem of PIR is structurally much harder than a standard unencrypted query.

Homomorphic encryption is a type of encryption that permits computations to be performed on encrypted data by parties that do not possess the keys necessary to decrypt it. Each homomorphic encryption scheme supports a specific type of plaintext data, and a specific set of homomorphic computations (e.g., addition or multiplication) that can be performed over ciphertexts; when one of the homomorphic computations is applied to one or more ciphertexts, the result is an encryption of the plaintext values of the inputs with the chosen computation applied. Homomorphic encryption is a core component of many PIR algorithms.

A permutation network consists of a set of wires that carry data (including a set of N wires designated as "input wires" and N wires designated as "output wires"), and a set of configurable switches, where each switch accepts two input wires, has two output wires, and can be configured to either keep the output wire values the same as the input values or swap them. The set of wires and switches is arranged such that every possible permutation of input wires to output wires can be achieved by some configuration of the switches, without changing anything else about the topology of the network.

Permutation networks were initially developed to produce efficient switchboards for telecommunications purposes, and have since been adapted for myriad other purposes such as cryptography and zero-knowledge proofs. The most efficient permutation networks for N input and output wires generally require O (N log N) switches; some examples of such permutation networks are those by Benes and Waksman.

Example Embodiments

The systems and methods disclosed herein implement a technique for creating an encrypted index of a database, which supports efficient (i.e., sub-linear) amortized performance of encrypted queries without requiring the querier to download the database in advance of the query.

FIG. 1 illustrates a high-level architecture of the system 100 for securely querying an encrypted database, comprising several major components. The system architecture for securely querying an encrypted database can include a user terminal 102, a query processor 104, a database server 106, and secure communication channel or network 108. The user terminal 102 is the interface through which the user interacts with the system, such as a computer or smartphone and is responsible for submitting queries, receiving results, and handling local processing tasks like decrypting data and managing cryptographic keys. This user terminal 102 forms the user's primary point of interaction with the system, ensuring that queries are securely initiated and results are properly handled.

The query processor 104 acts as an orchestrator managing the flow of data between the user terminal and the database. The query processor 104 initiates the construction of encrypted indexes by creating the encrypted swap vectors and transmitting them to the database server 106. After the construction of one or more encrypted indexes, the query processor 104 supports user queries from the user terminal 102 by using the encrypted indexes to retrieve the requested information while ensuring the constraints of the user query remain private. The query processor 104 also receives encrypted results from the database and forwards them to the user terminal.

The query processor 104 can include an encryption and key management module or function, which is responsible for all encryption and decryption tasks, as well as managing cryptographic keys. This module ensures that communications between the user terminal 102, query processor 104, and database server 106 are encrypted, and it generates and manages the encrypted swap vectors used to create the encrypted index.

The database server 106 hosts the actual database, which includes both plaintext and encrypted data. This database server 106 stores the encrypted index and processes queries on this index. When the query processor 104 requests data, the database server retrieves and returns encrypted records matching the query, ensuring that the underlying data and query constraints remain confidential. The secure interaction between these components is maintained using a secure communication channel or network 108, which encrypts all data exchanged between the user terminal 102, query processor 104, and database server 106. This channel employs protocols like Transport Layer Security (TLS) to prevent interception or tampering during data transmission.

Figure 2:
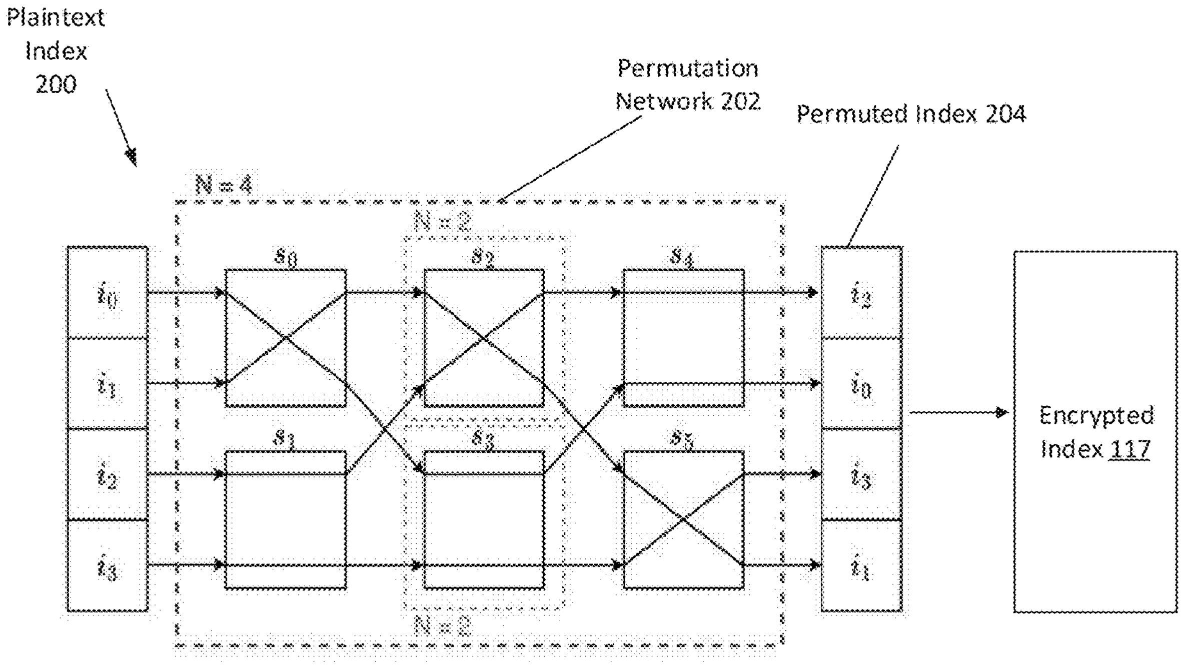
FIG. 2 illustrates the process of constructing a permuted index using a permutation network, which reorders input data to generate the encrypted index.
Figure 3:
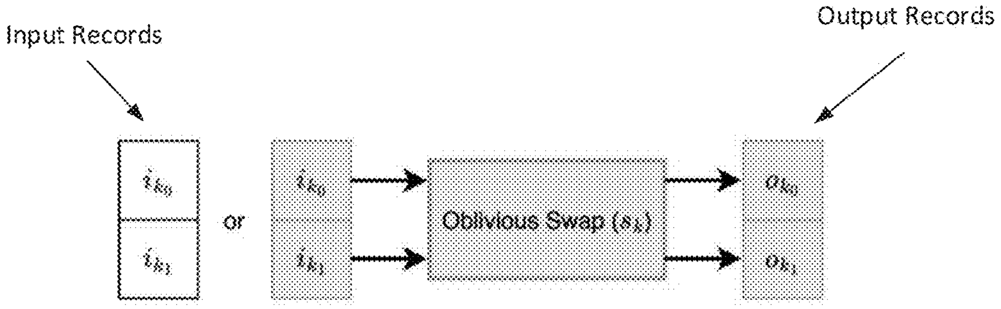
FIG. 3 illustrates a single oblivious swap gate within the permutation network, demonstrating how input pairs are conditionally swapped based on control bits.
Figure 4:
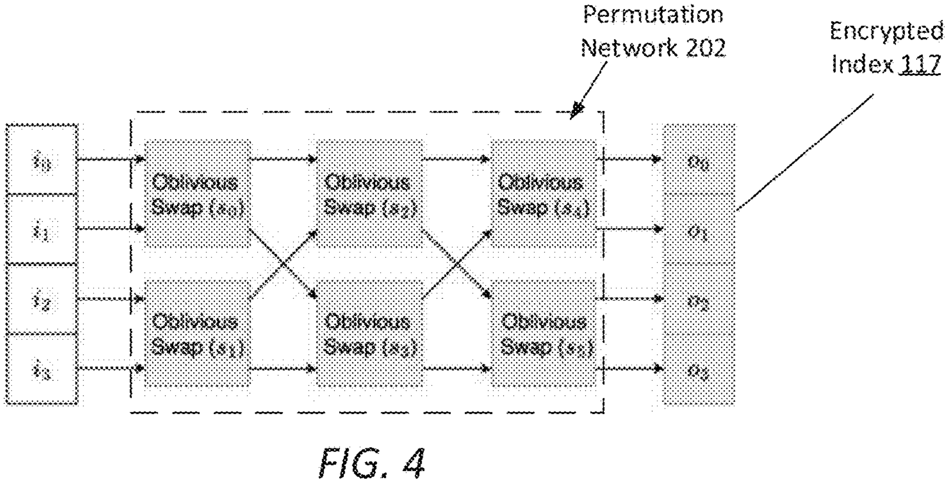
FIG. 4 illustrates the detailed structure of the permutation network, highlighting the sequence of oblivious swap gates used to transform input data into the permuted index.

An example method for constructing an encrypted index is illustrated in FIGS. 2-4. The process of building the encrypted index 117 begins with the construction of a plaintext index 200 by the database server 106. This plaintext index 200 is organized based on a specific subset of attributes from each record, referred to as the "indexed attributes" (e.g., first and last names). The selection of these attributes determines the types of queries that the index can efficiently support. The plaintext index 200 is structured such that records are sequentially labeled from 1 to N, where N is a known positive integer accessible to all potential queriers. This sequential labeling allows a querier to determine the specific label corresponding to desired data based on the values of the indexed attributes before submitting a query. One common method to achieve this mapping is by applying a hash function (such as SHA or XXHASH) to the indexed attribute values of each record, producing an integer X, and assigning the record to label X mod N. The choice of hashing method can vary depending on the dataset's characteristics but serves the fundamental purpose of enabling efficient and predictable data retrieval. In some embodiments, the hash function used to map records to integers is specifically chosen to optimize performance based on the characteristics of the dataset. For example, a non-cryptographic hash function, such as XXHASH, may be selected for its speed and low collision rate, making it suitable for large datasets with uniform distribution. When dealing with complex datasets, where the indexed attributes have a highly skewed or non-uniform distribution, additional steps may be taken to ensure the hash function provides an even spread of integer mappings. This may involve pre-processing the data to analyze the distribution of attribute values and selecting or adjusting the hash function accordingly. For instance, in cases where certain attributes dominate the dataset, the hash function might incorporate a weighting mechanism to balance the integer mapping across the dataset. This ensures that the mapping process remains efficient and effective, regardless of the dataset's structure, enabling consistent and predictable data retrieval during query processing.

Once the plaintext index 200 is constructed, the query processor 104, acting on behalf of a querying entity (the querier), initiates the creation of an encrypted index 117. The process begins by selecting a random permutation of the sequence [1, 2, . . . , N] using a cryptographically secure pseudorandom number generator. Next, a permutation network 202 large enough to accommodate N inputs and outputs is chosen. FIG. 2 illustrates a permutation network 202 that handles 4 inputs and outputs. The permutation network 202 constructs a permuted index 204. The permutation network 202 consists of a series of swap gates, where each gate contains two data inputs, one control bit input, and two outputs. If the control bit input is 0, the inputs pass through the gate to the output unchanged; if the control bit is 1, the inputs are swapped in the gate output. The arrangement of enough swap gates in a correct configuration allows the input data to be rearranged into any permutation by varying only the control bits of the swap gates in the network. For example, a Beneš network or a Waksman network may be selected due to their efficiency in handling large permutations with minimal computational overhead. Once the network type is selected, it is configured by determining the specific arrangement control bit values needed to achieve the desired permutation. This configuration process involves simulating the permutation network 202 with the sequence [1, 2, . . . , N] as input and adjusting the control bits so that the network output matches the randomly selected permutation. In FIG. 2, the swap gates are labeled s0-s5; to achieve the selected permutation, the control bits will be 0 for gates s1, s3, and s4, and 1 for gates s0, s2, and s5. The simulation ensures that each swap gate correctly transforms its inputs based on control bits, which are later encrypted as part of the encrypted swap vector. For non-expert users, this process can be understood as a systematic reordering of the records in the dataset, where the permutation network 202 acts as a blueprint that guides this reordering in a secure and reproducible manner. The configuration is designed to be efficient, allowing the system to handle even large datasets with high performance while maintaining the security of the underlying data.

Once the simulation is complete, the query processor 104 creates a vector containing the values of the control bits used in the simulated network (e.g., in FIG. 2 this vector would be [0, 1, 0, 1, 1, 0]) and encrypts them using a homomorphic encryption scheme. The result is called the "encrypted swap vector," and the query processor 104 transmits this to the database server 106 along with a request to create the encrypted index 117. Encrypting the control bits using homomorphic encryption ensures that even when the swap vector is transmitted to the database, the underlying permutation configuration remains secure and indecipherable by the database. Importantly, the secret key for the homomorphic encryption scheme is retained by the query processor 104 or another secure component, ensuring that the database cannot decrypt the swap vector or infer the permutation applied.

The database server 106 uses the encrypted swap vector to construct the encrypted index 117 by constructing a permutation network of the same size and structure as the one simulated by the query processor 104, with the swap gates replaced by oblivious swap gates. A single oblivious swap gate is illustrated in FIG. 3; it takes two data inputs (ik0 and ik1) that can be either plaintext values or homomorphically encrypted values, one homomorphically encrypted control bit input sk that is drawn from the encrypted swap vector, and produces two homomorphically encrypted outputs (ok0 and ok1). If the encrypted control bit sk is an encryption of 0, ok0 and ok1 will be encryptions of the data inputs in the same order; if sk is an encryption of 1, ok0 and ok1 will be encryptions of the data inputs in swapped order. Critically, because the control bit inputs and the outputs of the oblivious swap gate are encrypted, the evaluator of the oblivious swap gate cannot deduce whether the outputs contain swapped data or not.

The database server 106 evaluates the permutation network 202 of oblivious swap gates using the plaintext index 200 as the data inputs and the encrypted swap vector as the encrypted control bits. This process is illustrated in FIG. 4. The result of this process is the encrypted index 117, which contains encryptions of the records in plaintext index 200 shuffled into the permutation chosen by the query processor 104. Because a permutation network can construct any permutation of its inputs by varying only the control bits of the swap gates, and because the database server 106 cannot know the values of the encrypted swap bits used in the oblivious swap gates, the database server 106 cannot learn anything about what plaintext data is contained in each record of the encrypted index 117. The encrypted index 117 is now ready to support encrypted queries.

The process for executing an encrypted query once an encrypted index 117 is as follows. The user terminal 102 submits a query to the query processor 104, which computes the record labels between 1 and N in the plaintext index 200 that could contain information matching the query, applies the permutation used to construct the encrypted index 117 to those record labels, and forwards a request for the encrypted records at the permuted labels to the database server 106. The database server 106 retrieves the encrypted results matching the permuted labels from the encrypted index 117 and returns them to the query processor 104. The query processor 104 decrypts the encrypted results, extracts any matching records, and sends them to the user terminal 102, where they are presented to the user. This architecture ensures that sensitive data remains protected throughout the entire process, from the initial query to the retrieval and decryption of results.

The system includes a user interface (UI) 110, which serves as the entry point for users to interact with the system. The UI 110 allows users to submit queries specifying the constraints on the records they wish to retrieve and displays the results once the query has been processed. The user interface 110 is typically a software application or a web-based interface running on a user's device, such as a computer, smartphone, or tablet. This interface serves as the primary access point for users to submit queries and view the corresponding results. The user interface 110 is the primary access point for users to interact with the system. Beyond merely submitting queries and receiving results, the UI 110 is also responsible for ensuring that user input is properly formatted and validated before being transmitted to the query processor 104. Additionally, the UI 110 provides users with feedback on the status of their queries, including any errors or warnings that might occur during the query processing. This feedback loop ensures a smooth and user-friendly experience.

Supporting the encryption processes is the encryption and key management system 112. This component is responsible for managing all cryptographic keys required for encrypting and decrypting both the encrypted swap vector and encrypted results. The encryption and key management system 112 includes functionalities for key generation, storage, retrieval, and the encryption/decryption processes. The encryption and key management system 112 could be a combination of software and hardware, such as a hardware security module (HSM) or dedicated key management server. Additionally, the encryption and key management system 112 is designed to prevent unauthorized access, even from within the system, by optionally implementing strict access controls and audit logs.

In one embodiment, the permutation network 114 and 202 is implemented using a Benes permutation network, as illustrated in FIG. 2. A Benes permutation network is a type of network that can permute its inputs into any possible order based on the configuration of its internal switches. For example, in a Benes network for N=4 elements, each switch can either swap its inputs or pass them unchanged, allowing for all possible permutations of the inputs. The recursive structure of the Benes network, where networks for larger values of N are built from smaller networks, makes it particularly efficient for this purpose. This capability is crucial for securely transforming the order of records in the encrypted database without revealing the permutation to unauthorized entities.

The database server 106 is a database management system (DBMS) running on a server or in a cloud environment. This component includes an encrypted database 116 that stores all data in an encrypted format and includes an encrypted index 117 to support efficient querying without exposing sensitive information. The encrypted database 116 with encrypted index operates not just as a storage solution but as a secure retrieval system. The database server 106 can process these encrypted queries without ever accessing the plaintext data, ensuring that all sensitive information remains protected.

The system architecture includes a secure storage component 118 that is responsible for storing information, such as cryptographic keys 120 and encrypted swap vectors 122, in a protected environment. This component may be implemented as a hardware security module (HSM) or a secure, isolated part of the cloud infrastructure. It ensures that sensitive data remains inaccessible to unauthorized parties, further reinforcing the system's overall security posture. The secure storage component is designed to handle the most sensitive information within the system, including cryptographic keys, encrypted swap vectors, and other data. This component is typically implemented as a hardware security module (HSM) or as part of a secure cloud infrastructure, offering a fortified environment that is resistant to both physical and digital attacks. By isolating this data from the rest of the system, the secure storage component ensures that even in the event of a breach, the most critical assets remain protected.

In some embodiments, the system incorporates a verification module 124 that checks the integrity of the data retrieved from the encrypted database. After the query is processed and the data is decrypted, the verification module 124 verifies that the data has not been tampered with during transmission or storage. This ensures that the results returned to the user are accurate and trustworthy, enhancing the reliability of the system. The verification module 124 is responsible for ensuring the accuracy and integrity of the data retrieved from the encrypted database 116. After the query is processed and the data is decrypted, verification module 124 checks the data for any signs of tampering or corruption. This process is useful in maintaining the trustworthiness of the system, as it ensures that users receive accurate and reliable information, even when operating within a fully encrypted environment.

To protect data during transmission, the system employs the secure communication channel or network 108. This channel ensures that all data exchanged between the user interface 110, query processor 104, and database server 106 remains encrypted and secure from interception or tampering. The secure communication channel or network 108 is typically implemented as a combination of network security protocols, such as Transport Layer Security (TLS) or Virtual Private Network (VPN) technology.

The secure communication channel or network 108 plays a role in protecting data as it moves between different components of the system. By implementing advanced encryption protocols, such as Transport Layer Security (TLS), this channel ensures that any data exchanged between the user interface 110, query processor 104, and database server 106 remains confidential and tamper-proof. Additionally, the secure communication channel or network 108 is equipped with mechanisms to detect and mitigate potential attacks, such as man-in-the-middle attacks, ensuring the integrity of the data throughout its journey.

The system architecture described herein outlines the roles of various components for securely processing queries on an encrypted database. The query processor 104, which acts as the orchestrator, is responsible for transforming the user's query into a secure form by applying a permutation network to obfuscate query constraints. The query processor 104 manages the creating of encrypted indexes and coordinates communication with the database server. The database server, which stores the encrypted index and processes queries, is optimized to handle multiple encrypted queries in parallel, reducing overall response time. The encryption and key management system plays a role in securely managing cryptographic keys used in encryption and decryption processes. Additionally, a secure storage component is responsible for safeguarding sensitive information such as cryptographic keys and encrypted swap vectors. The system also includes mechanisms for logging query transformations and encrypted transactions, providing an audit trail that enhances security and accountability.

Figure 5:
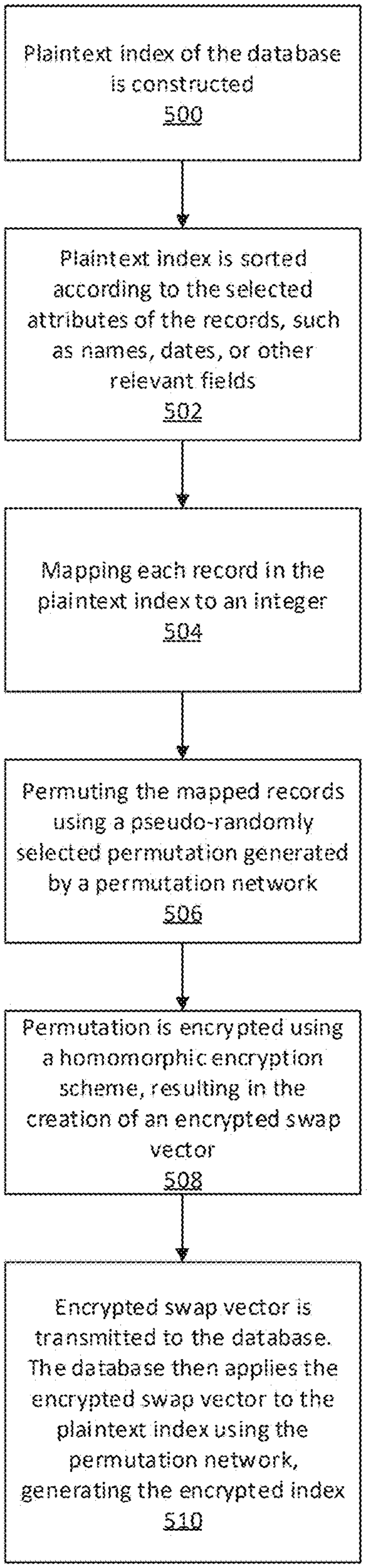
FIG. 5 illustrates a flowchart detailing the process for creating an encrypted index from a plaintext index, beginning with the construction of a plaintext index.

FIG. 5 illustrates a flowchart detailing the process for creating an encrypted index of a database. The process begins at step 500, where a plaintext index of the database is constructed. In this step, the records from the database are organized into an initial, unencrypted index.

In step 502, the plaintext index is sorted according to the selected attributes of the records, such as names, dates, or other relevant fields. The sorting process ensures that the records are arranged in an order that facilitates efficient searching and retrieval.

After sorting, step 504 involves mapping each record in the plaintext index to an integer. This mapping may be achieved by applying a hash function to the attributes of each record, assigning a unique integer to each one. The hash function, which need not be cryptographic, provides a consistent method for generating numerical identifiers, which are vital for the next stage of the process.

Step 506 involves permuting the mapped records using a pseudo-randomly selected permutation generated by a permutation network. The permutation network ensures that the reordering is secure and can be reliably reproduced by authorized systems.

The process then moves to step 508, where the control bits in the permutation network are encrypted using a homomorphic encryption scheme, resulting in the creation of an encrypted swap vector. Homomorphic encryption allows the permutation network to be evaluated in encrypted form, which makes it impossible for the entity evaluating the permutation network to learn the permutation being applied. The encrypted swap vector is a key component in maintaining the confidentiality of the permutation.

Finally, in step 510, the encrypted swap vector is transmitted to the database. The database then applies the encrypted swap vector to the plaintext index using the permutation network, generating the encrypted index. This encrypted index enables secure querying of the database, allowing sensitive information to be protected while still supporting efficient data retrieval.

Figure 6:
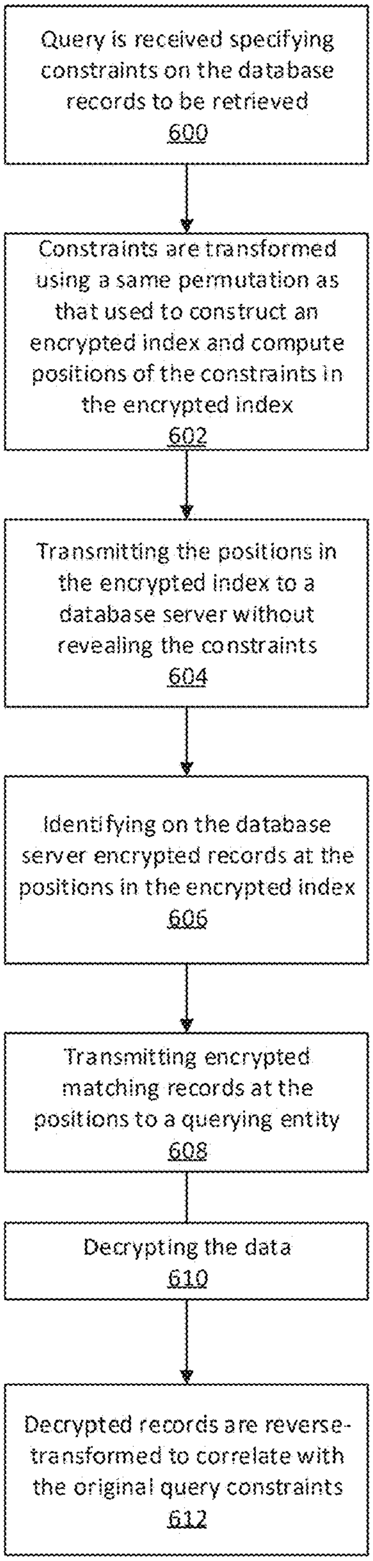
FIG. 6 illustrates a flowchart depicting the secure querying process on an encrypted database, from receiving the query to obtaining the encrypted results.

FIG. 6 outlines a method for securely querying a database using an encrypted index while preserving the privacy of query constraints. The process begins at step 600, where a query is received specifying constraints on the database records to be retrieved. This step involves capturing the specific requirements of the query, such as particular fields or values of interest. The constraints form the core of the query, defining the scope of the data retrieval process.

In step 602, the constraints are transformed using a same permutation as that used to construct an encrypted index and compute positions of the constraints in the encrypted index. This transformation ensures that the query constraints are obfuscated, preventing unauthorized parties from deducing the nature of the query. The query processor applies the permutation to the plaintext index labels corresponding to the query constraints, resulting in permuted index positions. These permuted positions are then used to identify the relevant records in the encrypted index without revealing the specific query constraints or their corresponding plaintext values to the database. This step ensures that the privacy of the query constraints is preserved while enabling secure and efficient data retrieval.

Step 604 involves transmitting the positions in the encrypted index to a database server without revealing the constraints. The query processor sends the permuted positions, corresponding to the transformed query constraints, over a secure communication channel. Since only the permuted positions are transmitted, the actual query constraints remain hidden from the database server, ensuring that no sensitive information about the query itself is exposed. The server can then use these positions to retrieve the relevant encrypted records from the encrypted index without gaining any knowledge of the underlying query details or the plaintext data associated with those positions.

In step 606, the method includes identifying on the database server encrypted records at the positions in the encrypted index. Using the positions provided by the query processor, the database server retrieves the corresponding encrypted records from the encrypted index. Since the server operates solely on encrypted data and does not have access to the permutation or the query constraints, it cannot infer any information about the nature of the query or the plaintext content of the records. The server retrieves the encrypted records at the specified positions and prepares them for secure transmission back to the querying entity, ensuring that the process preserves data privacy and security throughout.

Step 608 includes transmitting encrypted matching records at the positions to a querying entity. The database server, after retrieving the encrypted records, securely transmits them over an encrypted communication channel, ensuring that the records cannot be intercepted or tampered with during transmission. Since the records remain encrypted throughout this process, the database server does not learn any information about the content of the records or the nature of the query. The querying entity, typically the query processor or the user terminal, receives the encrypted records and retains full control over decryption, ensuring that only authorized parties can access the plaintext data. This step maintains the end-to-end privacy of the query and the data being retrieved.

Upon receiving the encrypted records, step 610 involves decrypting the data. The querying entity applies the appropriate cryptographic keys to decrypt the records, making them accessible for analysis. Finally, in step 612, the decrypted records are reverse-transformed to correlate with the original query constraints. This step allows the user to interpret the data in the context of their initial query while ensuring that privacy is maintained throughout the process. The reverse transformation ensures that the data can be accurately matched to the query constraints, providing the final query results.

Use Case Example

A multi-national bank may have branches in so-called "secrecy jurisdictions," nations such as Switzerland that have strict laws requiring banks to protect personal information of their clients and prohibit sending any such information to parties outside the jurisdiction, even to branches of the same bank located in other countries. The bank may maintain a database containing information on individuals suspected of illegal behavior, such as fraud or money laundering, across all non-secrecy jurisdictions. For example, this database may be hosted in the United States.

When a customer in Switzerland applies to open an account with the bank, the bank may want to check the customer's information against the database to help assess the risk of doing business with them. However, Switzerland's privacy laws prevent the bank from attempting to look up the individual in the database using a plaintext query, because that would disclose the individual's information to the database administrator, a party in the United States, and thereby violate Swiss law.

Using the concepts disclosed here, the bank could enable the Swiss branch to make an encrypted query against the database for the customer's information. Because the query constraints are encrypted, the database administrator or any other parties outside Switzerland could not learn anything about the customer during the query process. The Swiss branch could obtain additional risk information about the customer, allowing it to make better decisions about which customers to onboard. And because these systems and methods support queries against encrypted indexes at speeds comparable to a plaintext database query, these processes could be done without slowing down the application process or harming the bank's onboarding experience.

Figure 7:
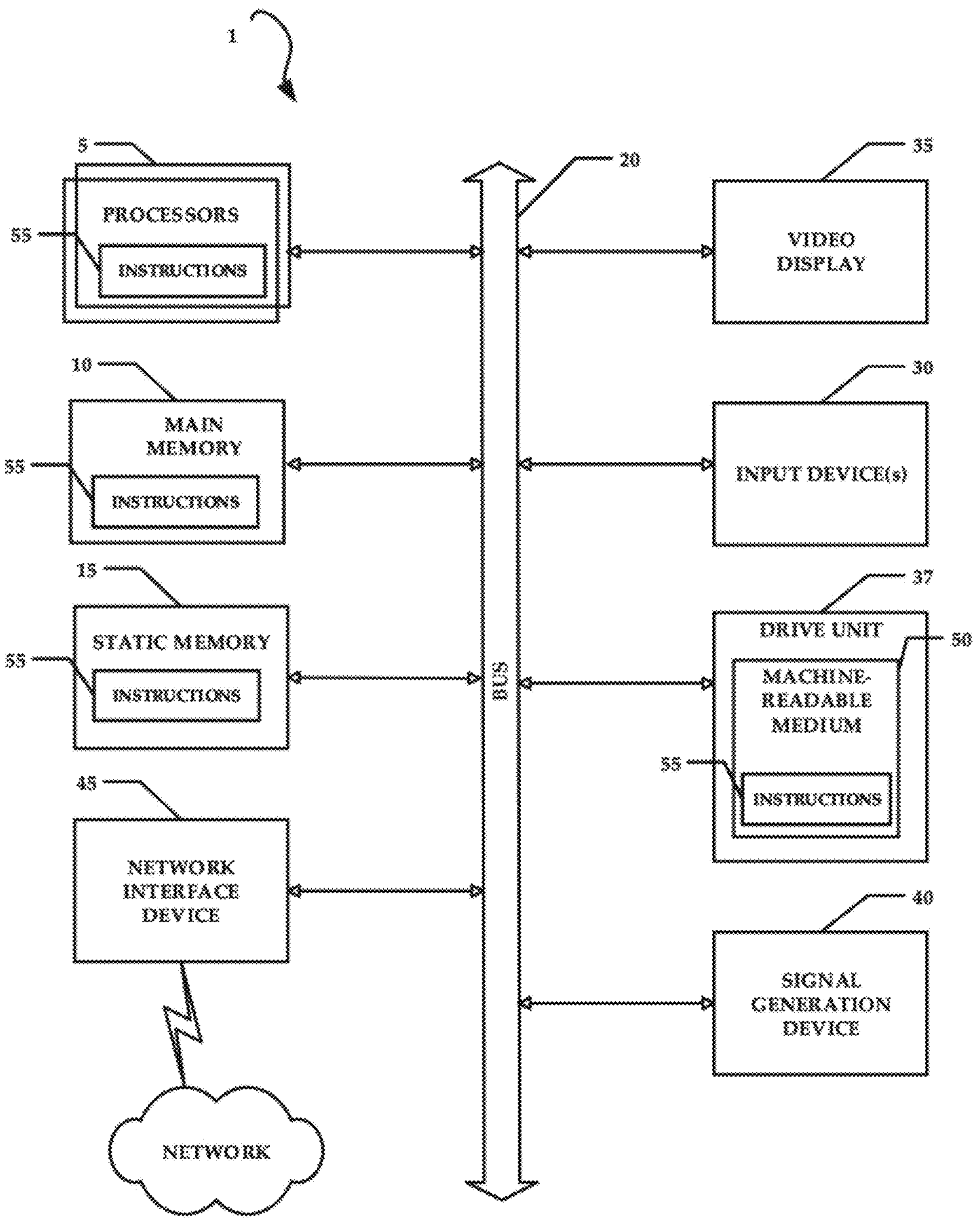
FIG. 7 illustrates a schematic representation of a computer system capable of being used in a system for secure query processing methods for encrypted databases.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "*N+1*") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for creating an encrypted index of a database, the method comprising:

constructing a plaintext index of a database, wherein the plaintext index is sorted based on a subset of attributes of records in the database;

mapping each record in the plaintext index to an integer using a deterministic function based on the attributes of the record;

permuting the mapped records using a pseudo-randomly selected permutation generated by a permutation network;

encrypting the permutation using a homomorphic encryption scheme to create an encrypted swap vector; and transmitting the encrypted swap vector to the database, wherein the database generates the encrypted index by applying a series of oblivious swaps to the plaintext index using the permutation network and the encrypted swap vector.

2. The method of claim 1, wherein the deterministic function is a hash function used to map records to integers.

3. The method of claim 1, further comprising simulating the permutation network to compute a valid configuration of swap gates that realizes a desired permutation.

4. The method of claim 3, wherein the permutation network comprises a plurality of swap gates, each configured to conditionally swap two inputs based on control bits.

5. The method of claim 4, wherein the control bits are later encrypted, and the encrypted swap vector comprises the encrypted control bits for each swap gate in the permutation network.

6. The method of claim 1, wherein the database generates the encrypted index by evaluating the permutation network using the oblivious swaps specified by the encrypted swap vector and storing resulting ciphertexts as the encrypted index.

7. The method of claim 1, wherein the encrypted index allows for secure querying by:

computing plaintext index labels for query values;

identifying corresponding positions in the encrypted index; and retrieving encrypted records from those positions.

8. A method for securely querying an encrypted database, the method comprising:

receiving a query specifying constraints on database records to be retrieved;

transforming the constraints using a same permutation as that used to construct an encrypted index and compute positions of the constraints in the encrypted index;

transmitting the positions in the encrypted index to a database server without revealing the constraints;

identifying on the database server encrypted records at the positions in the encrypted index;

transmitting encrypted matching records at the positions to a querying entity;

decrypting the encrypted matching records; and reverse-transforming decrypted records to correlate with the query constraints, thereby obtaining query results while maintaining privacy.

9. The method of claim 8, further comprising computing a plaintext index label for a query value and finding a position of the computed plaintext index label in a chosen permutation.

10. The method of claim 8, wherein the query comprises a position of the query value in a permuted index, wherein the position is determined based on the plaintext index label computed for the query value.

11. The method of claim 8, further comprising locally storing the decrypted records and corresponding plaintext index labels retrieved from the encrypted index for future queries.

12. The method of claim 8, wherein reverse-transforming decrypted records comprises correlating the decrypted records with the query constraints using plaintext index labels associated with the decrypted records.

13. The method of claim 8, further comprising applying a permutation network to obfuscate the constraints, the permutation network being periodically re-randomized to regenerate the encrypted index.

14. A system for securely processing queries on an encrypted database, the system comprising:

a processor and memory for storing instructions, the processor executing the instructions to:

receive a query and apply a permutation network to obfuscate query constraints;

cause storage of an encrypted index of database records and execute a transformed query without revealing underlying data;

decrypt results and reverse-transform the decrypted results to match the query constraints; and securely manage and store cryptographic keys used in encryption and decryption processes.

15. The system of claim 14, wherein the processor is further configured to locally store decrypted records retrieved from the encrypted index.

16. The system of claim 15, wherein the processor is further configured to utilize the locally stored decrypted records to answer future queries that request the same records.

17. The system of claim 14, wherein the processor is further configured to select a random position in the encrypted index, retrieve an encrypted record from that position, decrypt the record, and store the decrypted record locally.

18. The system of claim 14, wherein the permutation network is configured to randomly vary configuration periodically to regenerate the encrypted index.

19. The system of claim 14, wherein the processor is further configured to periodically request that the encrypted database reconstruct the encrypted index with a new pseudo-random permutation, and to delete locally stored records after the encrypted index is reconstructed.

20. The system of claim 14, wherein the permutation network is implemented using a Benes or Waksman network.

* * * * *